United States Patent
Ryu et al.

(10) Patent No.: US 10,282,325 B2
(45) Date of Patent: May 7, 2019

(54) SEMICONDUCTOR DEVICE INCLUDING A PLURALITY OF CIRCUITS AND A BUS CONNECTING THE CIRCUITS TO ONE ANOTHER, AND METHOD OF OPERATING THE SEMICONDUCTOR DEVICE

(71) Applicant: SAMSUNG ELECTRONICS CO., LTD., Suwon-si, Gyeonggi-do (KR)

(72) Inventors: Suengchul Ryu, Hwaseong-si (KR); Je-Hyuck Song, Seoul (KR); Hyejeong Hong, Yongin-si (KR); Bumseok Yu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 73 days.

(21) Appl. No.: 15/390,888

(22) Filed: Dec. 27, 2016

(65) Prior Publication Data

US 2017/0185544 A1  Jun. 29, 2017

(30) Foreign Application Priority Data

Dec. 29, 2015 (KR) .................. 10-2015-0188707

(51) Int. Cl.
| | |
|---|---|
| G06F 13/36 | (2006.01) |
| G06F 13/38 | (2006.01) |
| G06F 13/40 | (2006.01) |
| G06F 13/00 | (2006.01) |
| G06F 13/18 | (2006.01) |
| G06F 13/16 | (2006.01) |

(52) U.S. Cl.
CPC .......... *G06F 13/18* (2013.01); *G06F 13/1673* (2013.01); *G06F 13/4068* (2013.01)

(58) Field of Classification Search
CPC .......... G06F 13/36; G06F 13/38; G06F 13/40; G06F 13/00
See application file for complete search history.

(56) References Cited

U.S. PATENT DOCUMENTS

| | | | |
|---|---|---|---|
| 6,671,761 B2 | 12/2003 | Kim | |
| 7,206,867 B2 | 4/2007 | Mosgrove | |
| 7,307,948 B2 | 12/2007 | Infante et al. | |
| 7,398,273 B2 | 7/2008 | Dobberpuhl et al. | |
| 7,679,133 B2 | 3/2010 | Son et al. | |
| 7,694,055 B2 * | 4/2010 | Orita | G06F 13/24 |
| | | | 710/240 |
| 7,712,098 B2 | 5/2010 | Chauvel et al. | |
| 8,051,253 B2 | 11/2011 | Okin et al. | |
| 8,427,891 B2 | 4/2013 | Best | |
| 8,539,129 B2 | 9/2013 | Wang | |
| 8,553,466 B2 | 10/2013 | Han et al. | |

(Continued)

FOREIGN PATENT DOCUMENTS

| | | |
|---|---|---|
| KR | 1020020013184 A | 2/2002 |
| KR | 20140046040 A | 4/2014 |

*Primary Examiner* — David E Martinez
(74) *Attorney, Agent, or Firm* — Volentine, Whitt & Francos, PLLC

(57) ABSTRACT

A semiconductor device includes a plurality of circuits, a general bus configured to be connected to each of the plurality of circuits and to provide a general channel among the plurality of circuits, and a designated bus configured to be connected to a subgroup of circuits from among the plurality of circuits and to provide a designated channel among the subgroup of circuits.

19 Claims, 10 Drawing Sheets

(56) References Cited

U.S. PATENT DOCUMENTS

| | | |
|---|---|---|
| 8,559,235 B2 | 10/2013 | Yoon et al. |
| 8,654,587 B2 | 2/2014 | Yoon et al. |
| 8,943,226 B1 | 1/2015 | Hoglund et al. |
| 2011/0233648 A1 | 9/2011 | Seol et al. |
| 2013/0086311 A1 | 4/2013 | Huang et al. |
| 2014/0047147 A1* | 2/2014 | Gyobu .................. G06F 13/374 710/121 |
| 2015/0100713 A1* | 4/2015 | Sengoku ............. G06F 13/4291 710/110 |

\* cited by examiner

US 10,282,325 B2

SEMICONDUCTOR DEVICE INCLUDING A PLURALITY OF CIRCUITS AND A BUS CONNECTING THE CIRCUITS TO ONE ANOTHER, AND METHOD OF OPERATING THE SEMICONDUCTOR DEVICE

CROSS-REFERENCE TO RELATED APPLICATIONS

A claim of priority under 35 U.S.C. § 119 is made to Korean Patent Application No. 10-2015-0188707, filed on Dec. 29, 2015, the entire contents of which are hereby incorporated by reference.

BACKGROUND

The present inventive concept relates to semiconductor devices, and more particularly, to a semiconductor device including a plurality of circuits and a bus connecting the circuits to one another, and a method of operating the semiconductor device.

Semiconductor devices may include a plurality of circuits constituted to perform various functions. The plurality of circuits may be embodied in one chip in the form of a system-on chip, or may be embodied in a plurality of different chips. The various circuits are connected to one another through a bus or an interconnection line, and are configured to communicate with one another through the bus or interconnection line to access a target circuit.

With the advancement of technology, the number of functions embodied in semiconductor devices has increased, and consequently the number of circuits in semiconductor devices and the complexity of buses or interconnections connecting the circuits to each other have increased. Because of such complexity, it has become more difficult to effectively schedule and adjust the order of work in a bus and/or interconnection based on priority. As a result, latency when accessing a target circuit through a bus or an interconnection may increase. There is thus demand for a new bus or a new interconnection that supports scheduling capable of processing work) having higher priority first, to reduce latency with respect to urgent requests.

SUMMARY

Embodiments of the inventive concept provide a semiconductor device. The semiconductor device may include a plurality of circuits, a general bus configured to be connected to each of the plurality of circuits and to provide a general channel among the plurality of circuits, and a designated bus configured to be connected to a subgroup of circuits from among the plurality of circuits and to provide a designated channel among the subgroup of circuits.

Embodiments of the inventive concept also provide a semiconductor device. The semiconductor device may include a plurality of circuits, a general bus connected to each of the plurality of circuits, and a designated bus connected to a first circuit and a second circuit from among the plurality of circuits. The first circuit is configured to determine priority of a request with respect to the second circuit, to access the second circuit through the designated bus upon determination that the priority of the request is high, and to access the second circuit through the general bus upon determination that the priority of the request is low.

Embodiments of the inventive concept provide a storage device. The storage device includes a nonvolatile memory device; and a memory controller configured to control operations in the nonvolatile memory device responsive to an internal device. The memory controller includes a plurality of circuits, a general bus configured to be connected to each of the plurality of circuits, and a designated bus configured to be connected to a first circuit and a second circuit from among the plurality of circuits. The first circuit is configured to access the second circuit selectively through the designated bus and the general bus according to a priority of the external request, and the second circuit is configured to provide communication between the first circuit and the nonvolatile memory device.

Embodiments of the inventive concept further provide an operation method of a semiconductor device including a general bus connected to each of a plurality of circuits, and a designated bus connected to a first circuit and a second circuit from among the plurality of circuits. The operation method may include determining by the first circuit priority of a request with respect to the second circuit, accessing of the second circuit by the first circuit through the designated bus when the priority of the request is high, and accessing of the second circuit by the first circuit through the general bus when the priority of the request is low.

BRIEF DESCRIPTION OF THE FIGURES

Embodiments of the inventive concept will be described below in more detail with reference to the accompanying drawings. Like numbers refer to like elements throughout.

DETAILED DESCRIPTION

Embodiments of inventive concepts will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
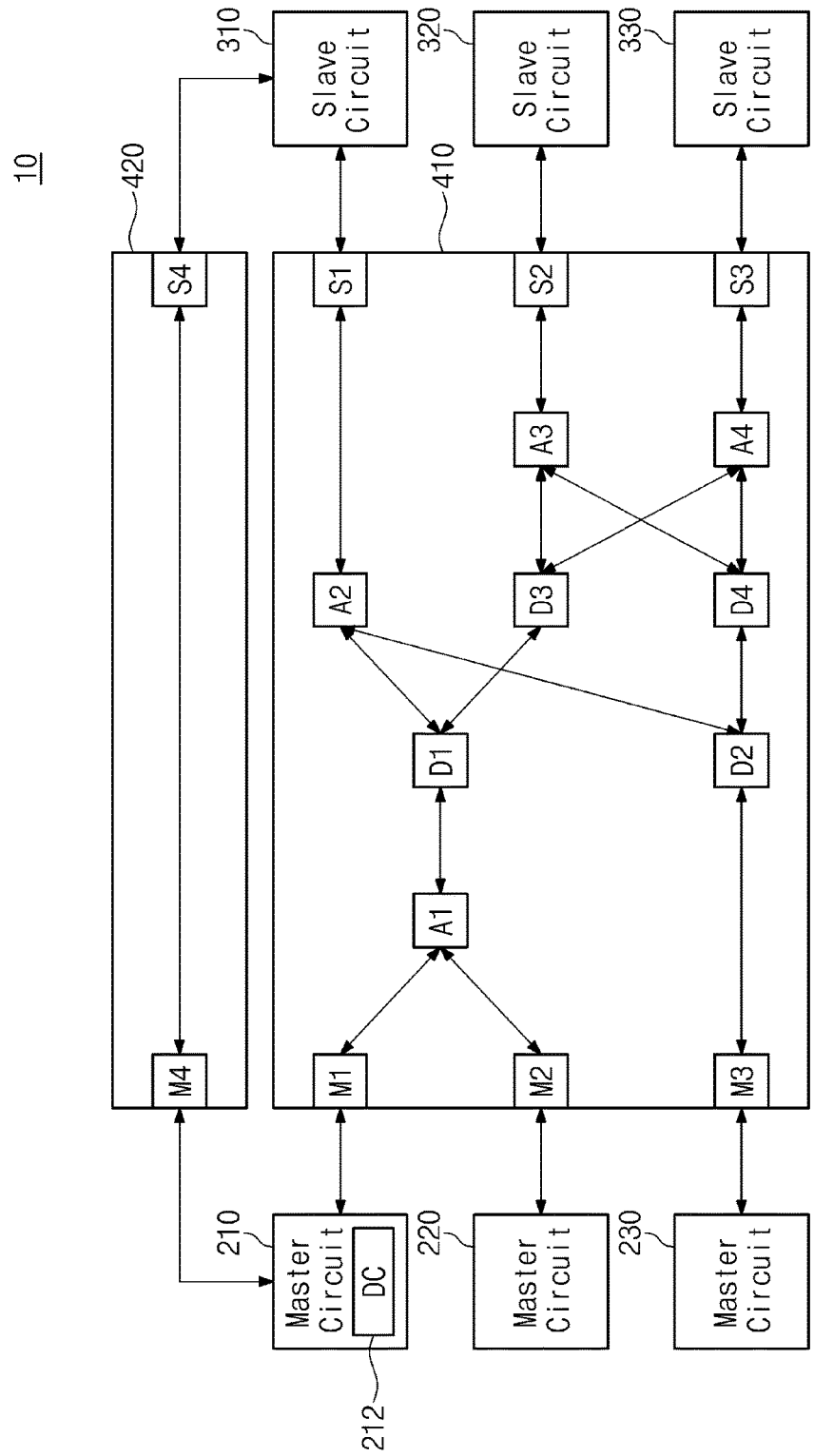
FIG. 1 illustrates a block diagram of a semiconductor device in accordance with example embodiments of the inventive concept.

FIG. 1 illustrates a block diagram of a semiconductor device 10 in accordance with example embodiments of the inventive concept. Referring to FIG. 1, the semiconductor device 10 includes first through third master circuits 210, 220 and 230 (210~230), first through third slave circuits 310, 320 and 330 (310~330), a general bus 410, and a designated bus 420.

The first through third master circuits 210~230 may be configured to communicate with one another or access the first through third slave circuits 310~330 through the general bus 410. The first through third slave circuits 310~330 may be accessed by the first through third master circuits 210~230 through the general bus 410. The first through third master circuits 210~230 and the first through third slave circuits 310~330 may be configured to perform predetermined functions respectively.

The general bus 410 is configured to be connected to the first through third master circuits 210~230 and the first through third slave circuits 310~330, and to provide a channel there between. The general bus 410 is called an interconnect and includes a plurality of nodes.

The general bus 410 includes input/output nodes configured to communicate with the first through third master circuits 210~230 and the first through third slave circuits 310~330. The input/output nodes configured to communicate with the first through third master circuits 210~230 may be called first through third master nodes M1, M2 and M3 (M1~M3) respectively. The input/output nodes configured to communicate with the first through third slave circuits 310~330 may be called first through third slave nodes S1, S2 and S3 (S1~S3) respectively.

The general bus 410 includes first through fourth addition nodes A1, A2, A3 and A4 (A1~A4) and first through fourth division nodes D1, D2, D3 and D4 (D1~D4) that connect the first through third master nodes M1~M3 and the first through third slave nodes S1~S3. In the inside of the general bus 410, an arrow that goes toward the first through third slave nodes S1~S3 from the first through third master nodes M1~M3 may represent a path of a request, data, a signal, a command, etc. that goes toward the first through third slave nodes S1~S3 from the first through third master nodes M1~M3. In the inside of the general bus 410, an arrow that goes toward the first through third master nodes M1~M3 from the first through third slave nodes S1~S3 may represent a path of a response, data, a signal, etc. that goes toward the first through third master nodes M1~M3 from the first through third slave nodes S1~S3.

In the inside of the general bus 410, the first master node M1 may be connected to the first slave node S1 through the first addition node A1, the first division node D1, and the second addition node A2. The first master node M1 may be connected to the second slave node S2 through the first addition node A1, the first division node D1, the third division node D3 and the third addition node A3. The first master node M1 may be connected to the third slave node S3 through the first addition node A1, the first division node D1, the third division node D3 and the fourth addition node A4.

In the inside of the general bus 410, the second master node M2 may be connected to the first slave node S1 through the first addition node A1, the first division node D1, and the second addition node A2. The second master node M2 may be connected to the second slave node S2 through the first addition node A1, the first division node D1, the third division node D3 and the third addition node A3. The second master node M2 may be connected to the third slave node S3 through the first addition node A1, the first division node D1, the third division node D3 and the fourth addition node A4.

In the inside of the general bus 410, the third master node M3 may be connected to the first slave node S1 through the second division node D2 and the second addition node A2. The third master node M3 may be connected to the second slave node S2 through the second division node D2, the fourth division node D4, and the third addition node A3. The third master node M3 may be connected to the third slave node S3 through the second division node D2, the fourth division node D4, and the fourth addition node A4.

As the number of types of functions supported by the semiconductor device 10 increases and the quality of the functions thereof is enhanced, the number of circuits constituting the semiconductor device 10 increases. As the number of circuits constituting the semiconductor device 10 increases, the complexity of the general bus 410 connecting the circuits constituting the semiconductor device 10 increases. For example, the number of nodes inside the general bus 410 may increase, and the number of paths connecting the nodes and the complexity of the paths may increase.

As the complexity of the general bus 410 increases, scheduling that adjusts the execution order of work inside the general bus 410 (i.e., transmission of a request, a response, data, a signal, a command, or the like between the master and slave circuits) becomes difficult. For example, messages requesting the second and third master circuits 220 and 230 to begin work with the second and third slave circuits 320 and 330 respectively through the general bus 410 may be transmitted to the general bus 410. After that, a message requesting work having higher priority that should be urgently handled by the first master circuit 210 to begin may be transmitted to the general bus 410. If the complexity of the general bus 410 is low, in the inside of the general bus 410, it may be relatively easy to transmit a message from the first master circuit 210 prior to messages from the second and third master circuits 220 and 230.

However, if circuits that communicate with the general bus 410 are large in number and the complexity of the general bus 410 is high, it is relatively difficult to transmit a message from the first master circuit 210 prior to the messages from the second and third master circuits 220 and 230. Although the message from the first master circuit 210 may be transmitted prior to the messages from the second and third master circuits 220 and 230 by scheduling, a transmission time of the message from the first master circuit 210 includes as much as a total sum of latencies that occur while the message from the first master circuit 210 passes through each node of the general bus 410. That is, in the case where only the general bus 410 is provided in the semiconductor device 10, as the number of types of functions supported by the semiconductor device 10 increases and the quality of the functions thereof is improved, thereby increasing the number of circuits of the semiconductor device 10, the semiconductor device 10 becomes 'a heavy device' in which it is difficult to handle urgent work or an urgent request preferentially.

The semiconductor device 10 according to example embodiments of the inventive concept further includes the designated bus 420. The designated bus 420 connects some circuits among the first through third master circuits 210~230 and the first through third slave circuits 310~330 connected to the general bus 410 to one another. For example, the designated bus 420 may be configured to connect circuits in which urgent work (or an urgent request) or work having higher priority (or a request having higher priority) occurs. As an illustration, the designated bus 420 is connected to the first master circuit 210 and the first slave circuit 310. The designated bus 420 includes the fourth master node M4 connected to the first master circuit 210, and the fourth slave node S4 connected to the first slave circuit 310.

The first master circuit 210 includes a determining circuit (DC) 212. The determining circuit (DC) 212 determines urgency or a priority of work or a request that has to be handled by accessing the first slave circuit 310. According to a determination result, the determining circuit (DC) 212 can control activation and deactivation of the general bus 410 and the designated bus 420.

When handling nonemergency work (or a request) or work having lower priority (or a request having lower priority), the determining circuit (DC) 212 can control connections to the general bus 410 and the designated bus 420 such that the connection to the general bus 410 is activated. When the connection to the general bus 410 is activated, the connection to the designated bus 420 may be deactivated. For example, while the first master circuit 210 communicates with the first master node M1 and the first slave circuit 310 communicates with the first slave node S1, the first master circuit 210 may be prohibited from communicating with the fourth master node M4 and the first slave circuit 310 may be prohibited from communicating with the fourth slave node S4.

When handling urgent work (or a request) or work (or a request) having higher priority, the determining circuit (DC) 212 can control the connections to the general bus 410 and the designated bus 420 such that the connection to the designated bus 420 is activated. When the connection to the designated bus 420 is activated, parts associated with the first master circuit 210 and the first slave circuit 310 in the general bus 410 may be deactivated. For example, the first master node M1 and the first slave node S1 may be deactivated. For example, while the first master circuit 210 communicates with the fourth master node M4 and the first slave circuit 310 communicates with the fourth slave node S4, the first master circuit 210 may be prohibited from communicating with the first master node M1 and the first slave circuit 310 may be prohibited from communicating with the first slave node S1.

While the first master circuit 210 communicates with the fourth master node M4, a signal or data that has to be transmitted to the first master circuit 210 through the first master node M1 may be held in the first master node M1 or the previous first addition node A1 in the general bus 410. While the first slave circuit 310 communicates with the fourth slave node S4, a signal or data that has to be transmitted to the first slave circuit 310 through the first slave node S1 may be held in the first slave node S1 or the previous second addition node A2 in the general bus 410.

When urgent work (or a request) or work (or a request) having higher priority is completed using the designated bus 420, the first master circuit 210 and the first slave circuit 310 may be connected to the general bus 410 again and may resume a communication using the general bus 410. When a communication using the general bus 410 is resumed, a signal or data held in the first master node M1 or the first addition node A1 of the general bus 410 may be transmitted to the first master circuit 210. A signal or data held in the first slave node S1 or the second addition node A2 of the general bus 410 may be transmitted to the first slave circuit 310.

Regardless of whether the first master circuit 210 communicates with any one of the first master node M1 and the fourth master node M4, and the first slave circuit 310 communicates with any one of the first slave node S1 and the fourth slave node S4, the second and third master circuits 220 and 230 can freely communicate with the second and third master nodes M2 and M3 respectively and the second and third slave circuits 320 and 330 can freely communicate with the second and third slave nodes S2 and S3 respectively.

That is, a signal or data held in the general bus 410 while the first master circuit 210 and the first slave circuit 310 perform a communication through the designated bus 420 may include a signal or data that goes toward the first master circuit 210 or the first slave circuit 310 from at least one of the second and third master circuits 220 and 230 and the second and third slave circuits 320 and 330. A signal or data held in the general bus 410 while the first master circuit 210 and the first slave circuit 310 perform a communication through the designated bus 420 may include a signal or data that has been transmitted to the general bus 410 targeting the first master circuit 210 or the first slave circuit 310 before the first master circuit 210 or the first slave circuit 310 perform a communication through the designated bus 420, and a signal or data being transmitted inside the general bus 410 while the first master circuit 210 or the first slave circuit 310 perform a communication through the designated bus 420.

As described above, when handling nonemergency work (or a request) or work (or a request) having a lower priority, the first master circuit 210 and the first slave circuit 310 are configured to perform a communication through the general bus 410. Thus, the first master circuit 210 and the first slave circuit 310 can perform a communication in agreement with other circuits based on an arbitration scheme of the general bus 410.

When handling urgent work (or a request) or work (or a request) having higher priority, the first master circuit 210 and the first slave circuit 310 are configured to perform a communication through the designated bus 420. The designated bus 420 directly connects the first master circuit 210 and the first slave circuit 310 without scheduling. The designated bus 420 has a smaller number of nodes between the first master circuit 210 and the first slave circuit 310 compared with the general bus 410. That is, there is lower latency in the designated bus 420 between the first master circuit 210 and the first slave circuit 310 compared with the general bus 410. Thus, urgent work (or a request) or work (or a request) having higher priority can be performed more quickly compared with when using the general bus 410. That is, an operation speed of the semiconductor device 10 is improved and service quality provided by the semiconductor device 10 is improved.

Although first through third master circuits 210 to 230 and first through third slave circuits 310 to 330 are illustrated in FIG. 1, in other embodiments the semiconductor device 10 may include greater or fewer master circuits and/or greater or fewer slave circuits. That is, in other embodiments the number of master circuits and slave circuits are not limited to the number shown in FIG. 1.

In a first type of the semiconductor device, master circuits and slave circuits among a plurality of circuits that communicate with the general bus 410 may be fixed. The general bus 410 or the designated bus 420 may have a fixed structure as illustrated in FIG. 1.

In a second type of the semiconductor device, master circuits and slave circuits among a plurality of circuits that communicate with the general bus 410 may not be fixed. A first circuit that initiates first work together with a second circuit may operate as a master circuit with respect to the first work. The second circuit that performs work together with the first circuit that initiates the first work may operate as a slave circuit with respect to the first work. In this case, an input/output node of a general bus or a designated bus that communicates with the first circuit may be a master node and an input/output node of a general bus or a designated bus that communicates with the second circuit may be a slave node.

In the case where the second circuit initiates second work and the first circuit performs the work initiated by the second circuit together with the second circuit, the second circuit may operate as a master circuit and the first circuit may operate as a slave circuit. In this case, an input/output node of a general bus or a designated bus that communicates with the first circuit may be a slave node and an input/output node of a general bus or a designated bus that communicates with the second circuit may be a master node.

Depending on whether each circuit operates as a master or operates as a slave, the general bus 410 or the designated bus 420 may constitute a connection between master circuits and slave circuits based on a suitable arbitration scheme. For example, the general bus 410 and the designated bus 420 illustrated in FIG. 1 may be an example that when circuits operating as a master and circuits operating as a slave are determined, the general bus 410 and the designated bus 420 are constituted according to a suitable arbitration scheme.

Figure 2:
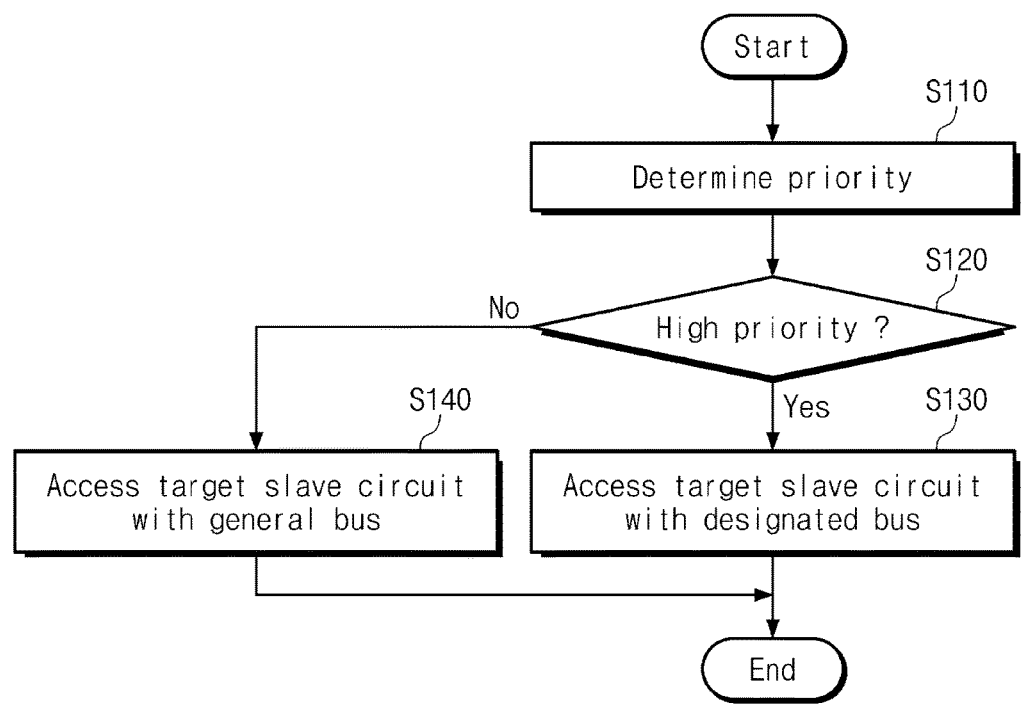
FIG. 2 illustrates a flowchart of an operation method of a semiconductor device in accordance with example embodiments of the inventive concept.

FIG. 2 illustrates a flowchart of an operation method of a semiconductor device in accordance with example embodiments of the inventive concept. Referring to FIGS. 1 and 2, the determining circuit (DC) 212 determines priority of work or a request in operation S110. Thereafter in operation S120, determining circuit (DC) 212 determines if the priority of the work or the request is high. For example, the determining circuit (DC) 212 may determine whether a priority of the work or the request is high (or urgent), and that the work or the request thus has to be handled by accessing the first slave circuit 310 connected through the designated bus 420.

If the priority is determined to be high in operation S120 (Yes), the procedure goes to operation S130. In operation S130, the first master circuit 210 accesses the first slave circuit 310 through the designated bus 420 and handles the work or the request. If the priority is determined to not be high in operation S120 (No), operation S140 is performed. In operation S140, the first master circuit 210 accesses the first slave circuit 310 through the general bus 410 and handles the work or the request.

Figure 3:
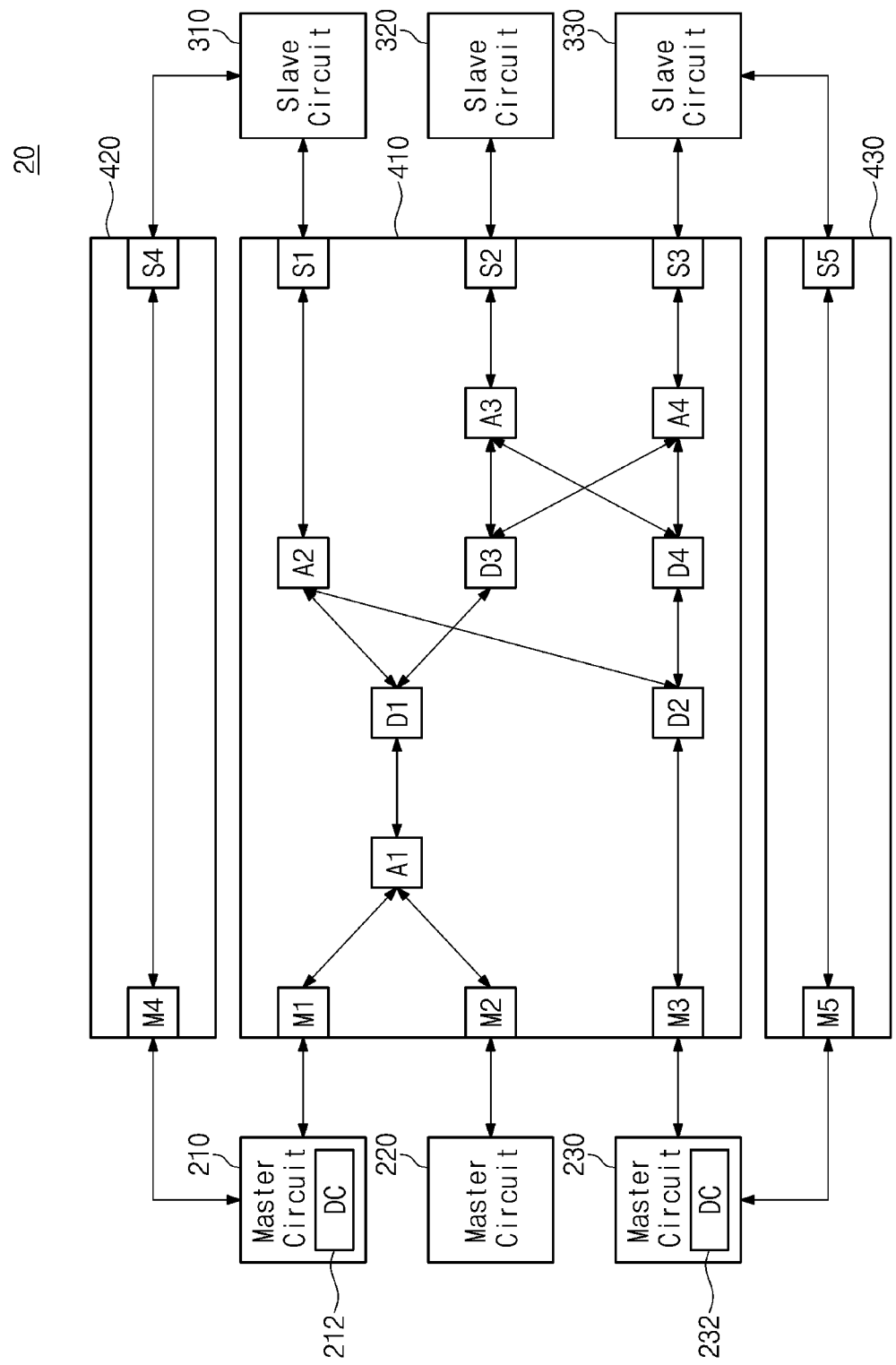
FIG. 3 illustrates a block diagram of an application example of the semiconductor device of FIG. 1.

FIG. 3 illustrates a block diagram of an application example of the semiconductor device of FIG. 1. Referring to FIG. 3, a semiconductor device 20 includes first through third master circuits 210 to 230, first through third slave circuits 310 to 330, a general bus 410 and designated buses 420 and 430.

In comparison with semiconductor device 10 of FIG. 1, the semiconductor device 20 of FIG. 3 further includes the designated bus 430 connecting the third master circuit 230 and the third slave circuit 330. The designated bus 430 includes a fifth master node M5 connected to the third master circuit 230 and a fifth slave node S5 connected to the third slave circuit 330. The fifth master node M5 and the fifth slave node S5 may be directly connected to each other.

The third master circuit 230 includes a determining circuit (DC) 232 configured to determine urgency or a priority of work or a request that has to be handled by accessing the third slave circuit 330. When the priority of work or a request is high (or urgent), the determining circuit (DC) 232 may control connections to the general bus 410 and the designated bus 430 such that the connection to the designated bus 430 is activated. When the priority of a work or a request is low (or not urgent), the determining circuit (DC) 232 can control the connections to the general bus 410 and the designated bus 430 such that the connection to the general bus 410 is activated.

While the third master circuit 230 communicates with a third master node M3 and the third slave circuit 330 communicates with a third slave node S3, the third master circuit 230 is prohibited from communicating with the fifth master node M5 and the third slave circuit 330 is prohibited from communicating with the fifth slave node S5. While the third master circuit 230 communicates with the fifth master node M5 and the third slave circuit 330 communicates with the fifth slave node S5, the third master circuit 230 is prohibited from communicating with the third master node M3 and the third slave circuit 330 is prohibited from communicating with the third slave node S3.

Regardless of whether the third master circuit 230 communicates with any one of the third and fifth master nodes M3 and M5, the third slave circuit 330 communicates with any one of the third and fifth slave nodes S3 and S5, the first master circuit 210 communicates with any one of first and fourth master nodes M1 and M4, and the first slave circuit 310 communicates with any one of first and fourth slave nodes S1 and S4, the second master circuit 220 can freely communicate with a second master node M2 and the second slave circuit 320 can freely communicate with a second slave node S2.

As described with reference to FIG. 3, two or more designated buses may be provided in a semiconductor device. The two or more designated buses may be configured to connect other circuits to one another. Each designated bus may be configured to directly connect to circuits.

Figure 4:
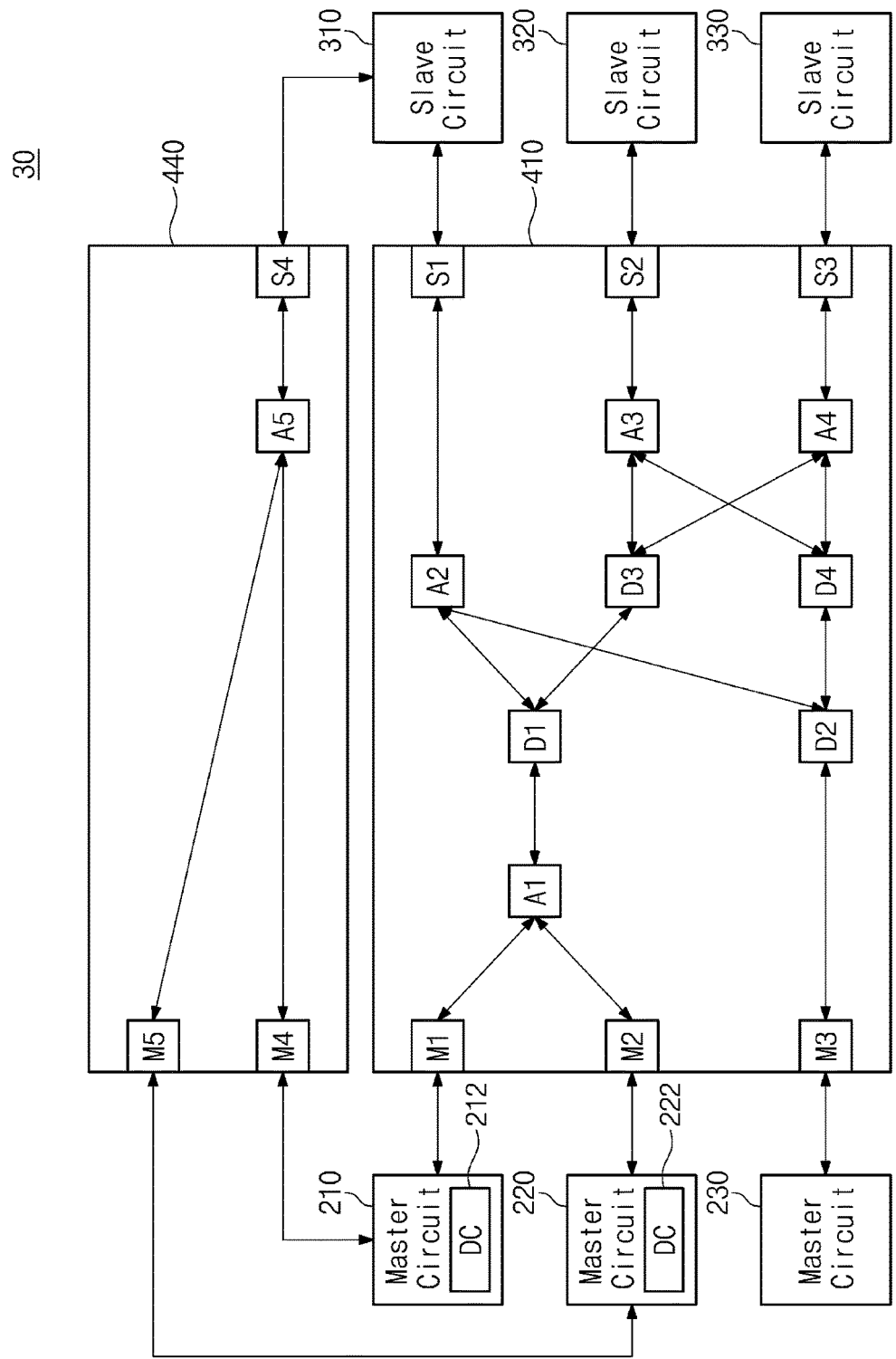
FIG. 4 illustrates a block diagram of another application example of the semiconductor device of FIG. 1.

FIG. 4 illustrates a block diagram of another application example of the semiconductor device of FIG. 1. Referring to FIG. 4, a semiconductor device 30 includes first through third master circuits 210 to 230, first through third slave circuits 310 to 330, a general bus 410, and a designated bus 440.

In comparison with the semiconductor device 10 of FIG. 1, semiconductor device 30 shown in FIG. 4 includes designated bus 440 instead of designated bus 420 included in semiconductor device 10. The designated bus 440 is connected to the first and second master circuits 210 and 220, and the first slave circuit 310. The designated bus 440 includes a fourth master node M4 connected to the first master circuit 210, a fifth master node M5 connected to the second master circuit 220, a fourth slave node S4 connected to the first slave circuit 310, and a fifth addition node A5 connecting the fourth and fifth master nodes M4 and M5 and the fourth slave node S4.

The first master circuit 210 includes a determining circuit (DC) 212 and the second master circuit 220 includes a determining circuit (DC) 222. The determining circuits (DC) 212 and 222 determine whether to use the general bus 410 or the designated bus 440 depending on a priority or urgency of work or a request that has to be handled by accessing the first slave circuit 310.

While the first master circuit 210 communicates with the fourth master node M4 and the first slave circuit 310 communicates with a fourth slave node S4, the first master circuit 210 is prohibited from communicating with a first master node M1 and the first slave circuit 310 is prohibited from communicating with the first slave node S1. While the second master circuit 220 communicates with the fifth master node M5 and the first slave circuit 310 communicates with the fourth slave node S4, the second master circuit 220 is prohibited from communicating with a second master node M2 and the first slave circuit 310 is prohibited from communicating with the first slave node S1.

If handling of work or a request having higher priority or urgency is completed through the designated bus 440, the first master circuit 210 may be connected to the general bus 410. If handling of work or a request having higher priority or urgency is completed through the designated bus 440, the second master circuit 220 may be connected to the general bus 410. If handling of work or a request associated with the first master circuit 210 or the second master circuit 220 is completed through the designated bus 440, the first slave circuit 310 may be connected to the general bus 410.

As described above, the designated bus 440 may be connected to three or more circuits and can arbitrate a communication among the three or more circuits. The number of circuits arbitrated by the designated bus 440 is thus smaller than the number of circuits arbitrated by the general bus 410. Latency that occurs in the designated bus 440 is therefore lower than latency that occurs in the general bus 410.

In FIG. 4, master circuits 210, 220 and 230 and slave circuits 310, 320 and 330 may be characterized as a plurality of circuits that are each connected to the general bus 410. Master circuit 210, master circuit 220 and slave circuit 310 may be characterized as a subgroup of circuits from among the plurality of circuits including master circuits 210, 220 and 230 and slave circuits 310, 320 and 330. The subgroup of circuits consisting of the master circuit 210, master circuit 220 and slave circuit 310 is connected to designated bus 440. That is, the designated bus 440 is configured to be connected to the subgroup of circuits consisting of master circuit 210, master circuit 220 and slave circuit 310. The general bus 410 is configured to be connected to each of the plurality of circuits including master circuits 210, 220 and 230 and slave circuits 310, 320 and 330. As a further example and somewhat similarly, in FIG. 1 the general bus 410 may be characterized as configured to be connected to each of a plurality of circuits including master circuits 210, 220 and 230 and slave circuits 310, 320 and 330. Also in FIG. 1, the designated bus 420 may be characterized as configured to be connected to a subgroup of circuits from among the plurality of circuits, the subgroup of circuits consisting of master circuit 210 and slave circuit 310.

The embodiments of FIGS. 1, 3 and 4 may be combined with one another. For example, a general bus and two or more designated buses may be provided in a semiconductor device. Each of the two or more designated buses may be connected to two or more circuits. The number of circuits connected to each of the two or more designated buses is smaller than the number of circuits connected to the general bus. While selected circuits communicate with the designated bus, the selected circuits may be prohibited from communicating with the general bus. While selected circuits communicate with the general bus, the selected circuits may be prohibited from communicating with the designated bus. Whether selected circuits communicate with the general bus or communicate with the designated bus depends on a priority or urgency of work or a request to be performed by the selected circuits.

Figure 5:
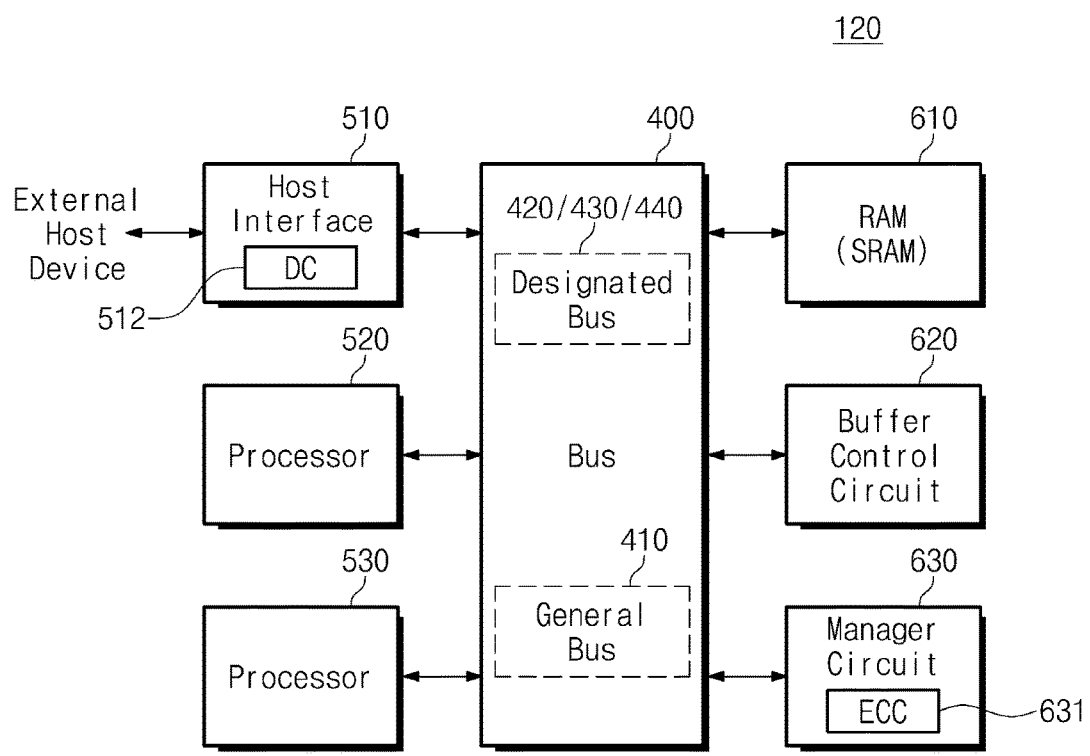
FIG. 5 illustrates a block diagram of a memory controller in accordance with example embodiments of the inventive concept.

FIG. 5 illustrates a block diagram of a memory controller 120 in accordance with example embodiments of the inventive concept. Referring to FIG. 5, the controller 120 includes a host interface 510, processors 520 and 530, a random access memory (RAM) 610, a buffer control circuit 620, a manager circuit 630, and a bus 400. The memory controller 120 may correspond to any one of the semiconductor devices 10, 20 or 30 described with reference to FIGS. 1, 3 and 4.

The bus 400 is configured to provide a channel between constituent elements of the controller 120. For example, the bus 400, as described with reference to FIGS. 1, 3 and 4, may include the general bus 410 and the designated bus (420, 430 or 440).

The host interface 510 and the processors 520 and 530 may respectively correspond to and serve as the master circuits 210, 220 and 230 described with reference to FIGS. 1, 3 and 4. The RAM 610, the buffer control circuit 620, and the manager circuit 630 may respectively correspond to and serve as the slave circuits 310, 320 and 330 described with reference to FIGS. 1, 3 and 4.

At least one of the host interface 510 and the processors 520 and 530 may be connected to the designated bus (420, 430 or 440) and may include a determining circuit (DC) described with reference to FIGS. 1, 3 and 4. The determining circuit (DC) determines whether to activate the general bus 410 or the designated bus (420, 430 or 440) of the bus 400. In FIG. 5, the determining circuit (DC) 512 is provided in the host interface 510. However, in other embodiments a determining circuit (DC) is not limited to being disposed in the host interface 510, and may be disposed in the processors 520 and 530.

At least one of the RAM 610, the buffer control circuit 620 and the manager circuit 630 may be connected to the designated bus (420, 430 or 440). For the purpose of illustration, in the following description it is assumed that the manager circuit 630 is connected to the designated bus (420, 430 or 440). However, in other embodiments the circuit connected to the designated bus (420, 430 or 440) is not limited to the manager circuit 630, and either of the RAM circuit 610 and the buffer control circuit 620 may be connected to the designated bus (420, 430 or 440).

The host interface 510 is configured to communicate with an external host device under the control of the processors 520 and 530. The host interface 510 includes the determining circuit (DC) 512.

The determining circuit (DC) 512 of the host interface 510 determines whether to activate the general bus 410 or the designated bus (420, 430 or 440) of the bus 400 based on information provided from the external host device or information internally managed.

The host interface 510 may be configured to perform a communication using at least one of various communication standards such as for example universal serial bus (USB), serial AT attachment (SATA), serial attachment SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), or the like.

The processors 520 and 530 can control an overall operation of the memory controller 120 and perform a logical operation. The processors 520 and 530 can communicate with an external host device through the host interface 510, communicate with a nonvolatile memory device through the manager circuit 630, and communicate with a buffer memory through the buffer control circuit 620. The processors 520 and 530 may use the RAM 610 as an operation memory, a cache memory, or a buffer memory. The processor 520 can control a signal or data being exchanged with the external host device through the host interface 510. The processor 530 can control a signal or data being exchanged with the nonvolatile memory device through the manager circuit 630.

The RAM 610 may be used as an operation memory, a cache memory, or a buffer memory. The RAM 610 can store codes and commands executed by the processors 520 and 530. The RAM 610 can store data processed by the processors 520 and 530. The RAM 610 may for example include SRAM (static RAM).

The buffer control circuit 620 is configured to control an external buffer memory under the control of the processors 520 and 530.

The manager circuit 630 is configured to communicate with the nonvolatile memory device under the control of the processors 520 and 530. The processors 520 and 530 can communicate a command, an address and data to the nonvolatile memory device through an input/output channel. The manager circuit 630 can communicate a control signal to the nonvolatile memory device through a control channel.

The manager circuit 630 may include an error correction block ECC 631. The error correction block ECC 631 may perform an error correction. The error correction block ECC 631 can perform an error correction encoding based on data to be written in the nonvolatile memory device through the manager circuit 630. The error correction encoded data may be transmitted to the nonvolatile memory device through the manager circuit 630. The error correction block ECC 631 may perform an error correction decoding on data received through the manager circuit 630 from the nonvolatile memory device.

In the case where the controller 120 does not communicate with the external buffer memory, the buffer control circuit 620 may not be provided as part of the controller 120.

The processors 520 and 530 can control the controller 120 using codes. The processors 520 and 530 can load codes from a nonvolatile memory device (e.g., read only memory) provided inside the controller 120. The processors 520 and 530 can load codes from the nonvolatile memory device through the manager circuit 630.

The bus 400 of the controller 120 may be divided into a control bus and a data bus. That is, the general bus 410 includes both a control bus and a data bus, and the designated bus (420, 430 or 440) includes both a control bus and a data bus. The data bus may be configured to transmit data inside the controller 120 and the control bus may be configured to transmit control information such as a command and an address inside the controller 120. The data bus and the control bus may be separated from each other and may not interfere with or not affect each other. The data bus may be connected to the host interface 510, the buffer control circuit 620, or the manager circuit 630. The control bus may be connected to the host interface 510, the processors 520 and 530, the buffer control circuit 620, the RAM 610 and the manager circuit 630.

Figure 6:
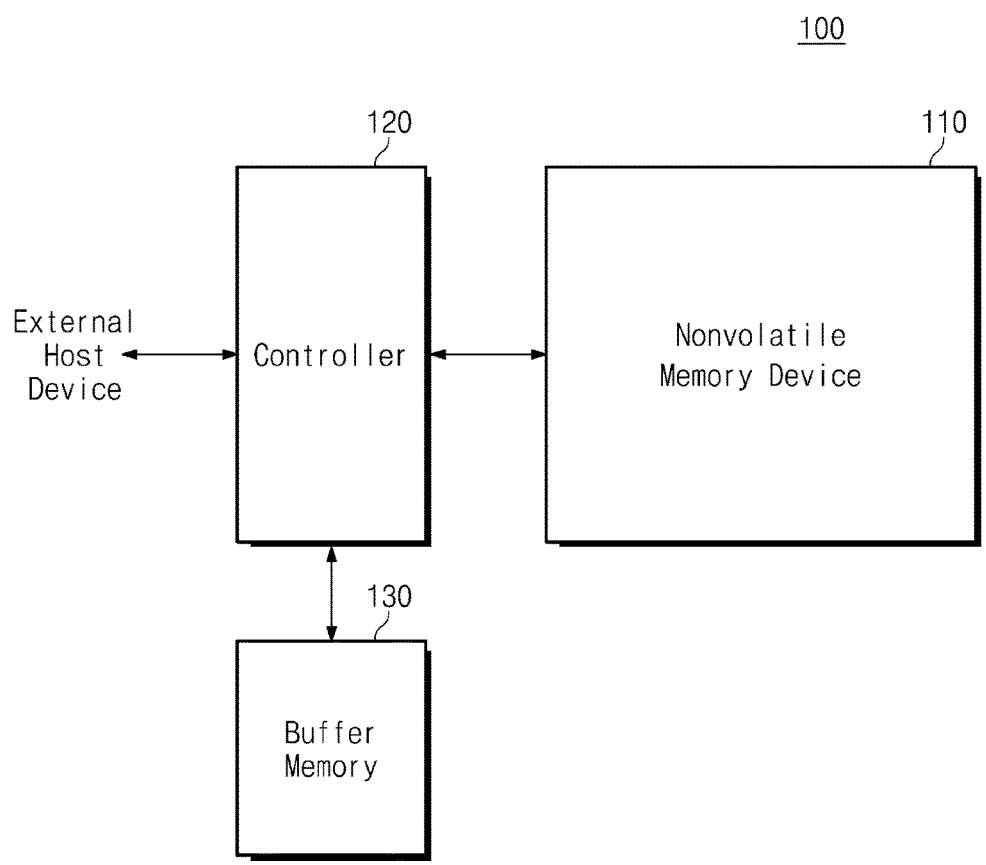
FIG. 6 illustrates a block diagram of a storage device including the memory controller of FIG. 5.

FIG. 6 illustrates a block diagram of a storage device 100 including the memory controller 120 (which may be hereinafter referred to as controller 120) of FIG. 5. Referring to FIG. 6, the storage device 100 includes a nonvolatile memory device 110, a controller 120, and a buffer memory 130.

The nonvolatile memory device 110 can perform write, read, and erase operations under the control of the controller 120. The nonvolatile memory device 110 can receive a command and an address from the controller 120 through an input/output channel. The nonvolatile memory device 110 can exchange data with the controller 120 through the input/output channel.

The nonvolatile memory device 110 can exchange a control signal with the controller 120 through a control channel. For example, the nonvolatile memory device 110 can receive a chip enable signal (/CE) selecting at least one nonvolatile memory chip among a plurality of nonvolatile memory chips of the nonvolatile memory device 110, a command latch enable signal (CLE) indicating that a signal being received from the controller 120 through the input/output channel is a command, an address latch enable signal (ALE) indicating that a signal being received from the controller 120 through the input/output channel is an address, a read enable signal (/RE) that is generated by the controller 120 during a read operation and periodically toggled to be used to adjust timing, a write enable signal (/WE) activated by the controller 120 when a command or an address is transmitted, a write protection signal (/WP) activated by the controller 120 to prevent an unwanted write or erase when a power supply is changed, and a data strobe signal (DQS) that is generated by the controller 120 during a write operation and periodically toggled to be used to adjust synchronization of data being transmitted through the input/output channel from the controller 120. For example, the nonvolatile memory device 110 can output a ready and busy signal (R/nB) indicating that the nonvolatile memory device 110 is performing a program, erase or read operation and a data strobe signal (DQS) that is generated from the read enable signal (/RE) by the nonvolatile memory device 110 and periodically toggled to be used to adjust an output synchronization of data to the controller 120.

The nonvolatile memory device 110 may include flash memory. However, the nonvolatile memory device 110 is not limited as including flash memory. The nonvolatile memory device 110 may include for example at least one among various types of nonvolatile memory devices such as phase-change RAM (PRAM), magnetic RAM (MRAM), a resistive RAM (RRAM), ferroelectric RAM (FeRAM), or the like.

The controller 120 is configured to control the nonvolatile memory device 110. For example, the controller 120 can control the nonvolatile memory device 110 to perform a write, read, or erase operation through the input/output channel and the control channel.

The controller 120 can control the nonvolatile memory device 110 under the control of an external host device. For example, the controller 120 can communicate with the external host device using a different format from a format used when communicating with the nonvolatile memory device 110. A unit of data by which the controller 120 communicates with the nonvolatile memory device 110 may be different from a unit of data by which the controller 120 communicates with the external host device.

The controller 120 may use the buffer memory 130 as a buffer memory, a cache memory, or an operation memory. The controller 120 can store data or a code needed to manage the nonvolatile memory device 110 in the buffer memory 130. For example, the controller 120 can read data or a code needed to manage the nonvolatile memory device 110 from the nonvolatile memory device 110 and load the read data or the read code into the buffer memory 130 to drive it.

The buffer memory 130 may include at least one among various types of random access memories such as for example dynamic random access memory (DRAM), static RAM (SRAM), synchronous DRAM (SDRAM), PRAM, MRAM, RRAM, FeRAM, or the like.

The nonvolatile memory device 110 may include a plurality of nonvolatile memory chips. The controller 120 and the nonvolatile memory chips may be connected to each other based on a channel and a way. One channel may include one data channel and one control channel. One data channel may include eight data lines. One control channel may include control lines through which the chip enable signal (/CE), the command latch enable signal (CLE), the address latch enable signal (ALE), the read enable signal (/RE), the write enable signal (/WE), the write protection signal (/WP), and the ready and busy signal (R/nB) that are described above are transmitted.

Nonvolatile memory chips connected to one channel may form a way. If n number of nonvolatile memory chips are connected to one channel, an n-way may be formed. Nonvolatile memory chips that belong to one way can share data lines, and control lines through which the command latch enable signal (CLE), the address latch enable signal (ALE), the read enable signal (/RE), the write enable signal (/WE), and the write protection signal (/WP) are transmitted. Each of the nonvolatile memory chips that belong to one way can communicate with the controller 120 through a designated control line through which the chip enable signal (/CE) and the ready and busy signal (R/nB) are transmitted.

The controller 120 can alternately access n-way nonvolatile memory chips connected to one channel. The controller 120 can independently access nonvolatile memory chips connected to different channels. The controller 120 can alternately or simultaneously access nonvolatile memory chips connected to different channels.

The nonvolatile memory chips may be connected to the controller 120 in the form of wide IO. For example, nonvolatile memory chips connected to different channels can share a control line through which one chip enable signal (/CE) is transmitted. The nonvolatile memory chips sharing the control line of the chip enable signal (/CE) may be accessed at the same time. Since data lines of different channels are used at the same time, a wide input/output bandwidth can be achieved.

The storage device 100 may include a solid state drive (SSD) or a hard disk drive (HDD). The storage device 100 may for example include memory cards such as a personal computer memory card international association (PCMCIA) card, a compact flash (CF) card, a smart media card (SM, SMC), a memory stick, a multimedia card (MMC, RS-MMC, MMCmicro), a secure digital (SD) card (SD, miniSD, microSD, SDHC), a universal serial bus (USB) memory card, a universal flash storage (UFS), or the like. The storage device 100 may for example include a mounting type memory such as an embedded multimedia card (eMMC), a UFS, a perfect page NAND (PPN), or the like.

In FIG. 6, the storage device 100 is illustrated as including the buffer memory 130 disposed outside the controller 120. However, in other embodiments the storage device 100 may not include the buffer memory 130 disposed outside the controller 120. The controller 120 may be configured to use the internal RAM 610 (refer to FIG. 5) as a buffer memory, an operation memory or a cache memory.

Figure 7:
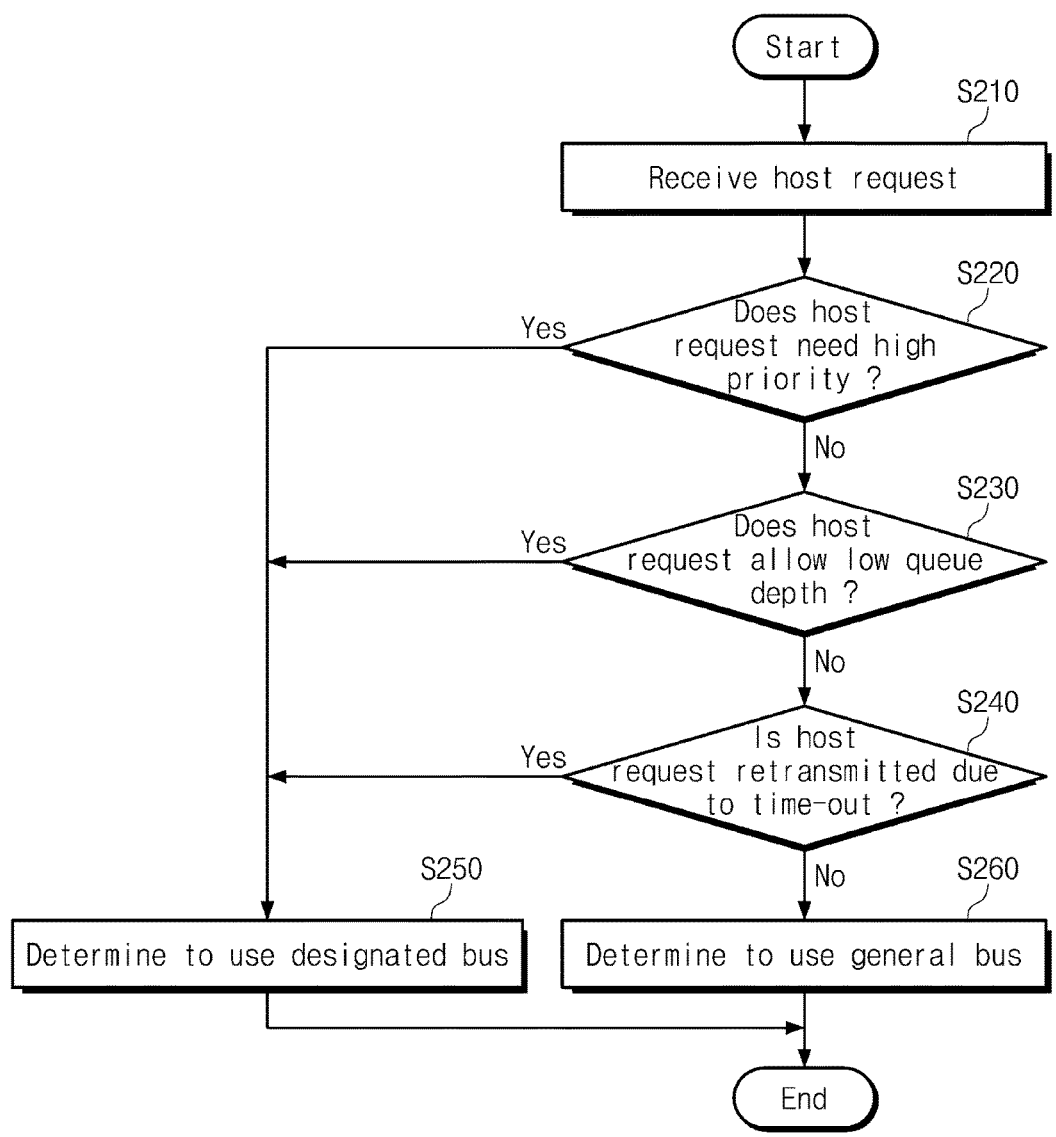
FIG. 7 illustrates a flowchart of an operation method of a storage device in accordance with example embodiments of the inventive concept.

FIG. 7 illustrates a flowchart of an operation method of a storage device in accordance with example embodiments of the inventive concept. Referring to FIGS. 5 through 7, in an operation S210, the host interface 510 receives a host request from the external host device. The process then proceeds to operation S220.

In operations S220 to S240, the determining circuit (DC) 512 of the host interface 510 determines whether a host request has higher priority or urgency.

In the operation S220, a priority of the host request is determined based on information included in the host request. For example, when the host request includes information of the priority, the priority may be determined according to the information of the priority included in the host request. For example, when the host request indicates some of a series of work that has to be performed in-order, the priority of the host request is determined to be high. For example, when the host request causes a flow of large-capacity data like a flush operation, the priority of the host request is determined to be high. For example, when the host request requests an immediate response like a write-through, the priority of the host request is determined to be high. If the priority of the host request is determined as high (Yes) in operation S220, the process proceeds to operation S250. If the priority of the host request is determined as low (No) in operation S220, the process proceeds to operation S230.

In the operation S230, the determining circuit DC 512 determines whether the host request allows low queue depth. For example, when a queue depth is smaller than a predetermined reference value, the determining circuit DC determines that the host request has a high priority. The reference value may be determined based on for example a type of an interface between the external host device and the storage device 100, an access frequency of the external host device to the storage device 100, among other factors. If the priority of the host request is determined as high (Yes) in operation S230, the process proceeds to operation S250. If the priority of the host request is determined as low (No) in operation S230, the process proceeds to operation S240.

In the operation S240, the determining circuit (DC) 512 determines whether the host request is retransmission caused by a time-out. For example, when the external host device transmits a host request to the storage device 100 and the storage device 100 makes no response in a limited time associated with the host request, a time-out may occur. When the time-out occurs, the external host device can retransmit the same host request to the storage device 100. If the host request corresponds to retransmission, the priority of the host request is determined to be high. If the priority of the host request is determined as high (Yes) in operation S240, the process proceeds to operation S250. If the priority of the host request is determined as low (No) in operation S240, the process proceeds to operation S260.

If one among conditions of the operations S220 to S240 is satisfied (e.g., Yes), the host request is determined to have higher priority. Thus, in an operation S250, the determining circuit (DC) 512 determines that the designated bus (420, 430, or 440) is used.

If conditions of the operations S220 to S240 are not satisfied (e.g., No), the host request is determined not to have higher priority. Thus, in an operation S260, the determining circuit (DC) 512 determines that the general bus 410 is used.

The host request may include information indicating higher priority. A request having higher priority may include a write request having higher priority or a read request having higher priority. If information having higher priority is detected from the host request, the determining circuit (DC) 512 may determine that the host interface 510 and the manager circuit 630 perform a communication through the designated bus (420, 430, or 440). The write request having higher priority or the read request having higher priority (or data according to the corresponding request) may be processed before other requests (or data according to the request) through the designated bus (420, 430, or 440). Thus, the controller 120 or the storage device 100 can rapidly respond to an urgent request of the external host device and an operation speed of the controller 120 or the storage device 100 increases, and service quality thereof is improved.

The host request may correspond to one of a series of work that has to be performed in-order. For example, the series of work that has to be performed in-order may include write requests (or read requests) that have to be performed in-order with respect to the nonvolatile memory device 110. Since the write requests (or read requests) have to be performed in-order, scheduling in the general bus 410 may become difficult. That is, the write requests (or read requests) that have to be performed in-order may increase latency in the general bus 410. When the host request is detected to be the write requests (or read requests) that have to be performed in-order, the determining circuit (DC) 512 may determine that the host interface 510 and the manager circuit 630 perform a communication through the designated bus (420, 430, or 440). When the write requests (or read requests) that have to be performed in-order or the data according to the corresponding request are transmitted between the host interface 510 and the manager circuit 630 through the designated bus (420, 430, or 440), an increase of latency of the general bus 410 by the write requests (or read requests) that have to be performed in-order is prevented. That is, an operation speed of the controller 120 or the storage device 100 including the controller 120 increases, and service quality thereof is improved.

The host request may cause a flow of large-capacity data like a flush operation. The flush request may request that all write data buffered in the buffer memory 130 be written in the nonvolatile memory device 110. If it is detected that the host request includes the flush operation, the determining circuit (DC) 512 can control the buffer control circuit 620 controlling the buffer memory 130 and the manager circuit 630 controlling the nonvolatile memory device 110 to communicate with each other through the designated bus (420, 430, or 440). The time taken for data according to the flush operation to be transmitted from the buffer control circuit 620 to the manager circuit 630 through the designated bus (420, 430, or 440) is shorter than the time taken for the data according to the flush request to be transmitted through the general bus 410. Thus, an operation speed of the controller 120 or the storage device 100 including the controller 120 increases, and service quality thereof is improved.

The host request may request an immediate response like a write-through. The write-through may request that write data not be buffered in the buffer memory 130, but instead be immediately programmed in the nonvolatile memory device 110. If it is detected that the host request includes the write-through, the determining circuit (DC) 512 may determine that the host interface 510 and the manager circuit 630 communicate with each other through the designated bus (420, 430, or 440). Data associated with the write-through is transmitted from the host interface 510 to the manager circuit 630 through the designated bus (420, 430, or 440) and is written in the nonvolatile memory device 110. That is, since the write-through request of the external host device is immediately processed, an operation speed of the controller 120 or the storage device 100 including the controller 120 increases, and service quality thereof is improved.

The host request may include information about a queue depth. The host request associated with a queue depth may include a write request or a read request with respect to the nonvolatile memory device 110. If the queue depth is small, scheduling in the general bus 410 becomes difficult and an effect of a pipeline that occurs by nodes in the general bus 410 is reduced. If it is detected that a queue depth associated with the host request is small, the determining circuit (DC) 512 controls the corresponding host request (or data corresponding to the corresponding request) to be transmitted to the manager circuit 630 through the designated bus (420, 430, or 440). Thus, an operation speed of the controller 120 or the storage device 100 including the controller 120 increases, and service quality thereof is improved.

The host request may be a retransmission caused by a time-out. The host request being retransmitted may include a write request or a read request with respect to the nonvolatile memory device 110. When it is determined that the host request is a retransmission, the determining circuit (DC) 512 can control the corresponding request to be transmitted to the manager circuit 630 through the designated bus (420, 430, or 440). Since the request in which a time-out occurs is rapidly processed, an operation speed of the controller 120 or the storage device 100 including the controller 120 increases, and service quality thereof is improved.

Figure 8:
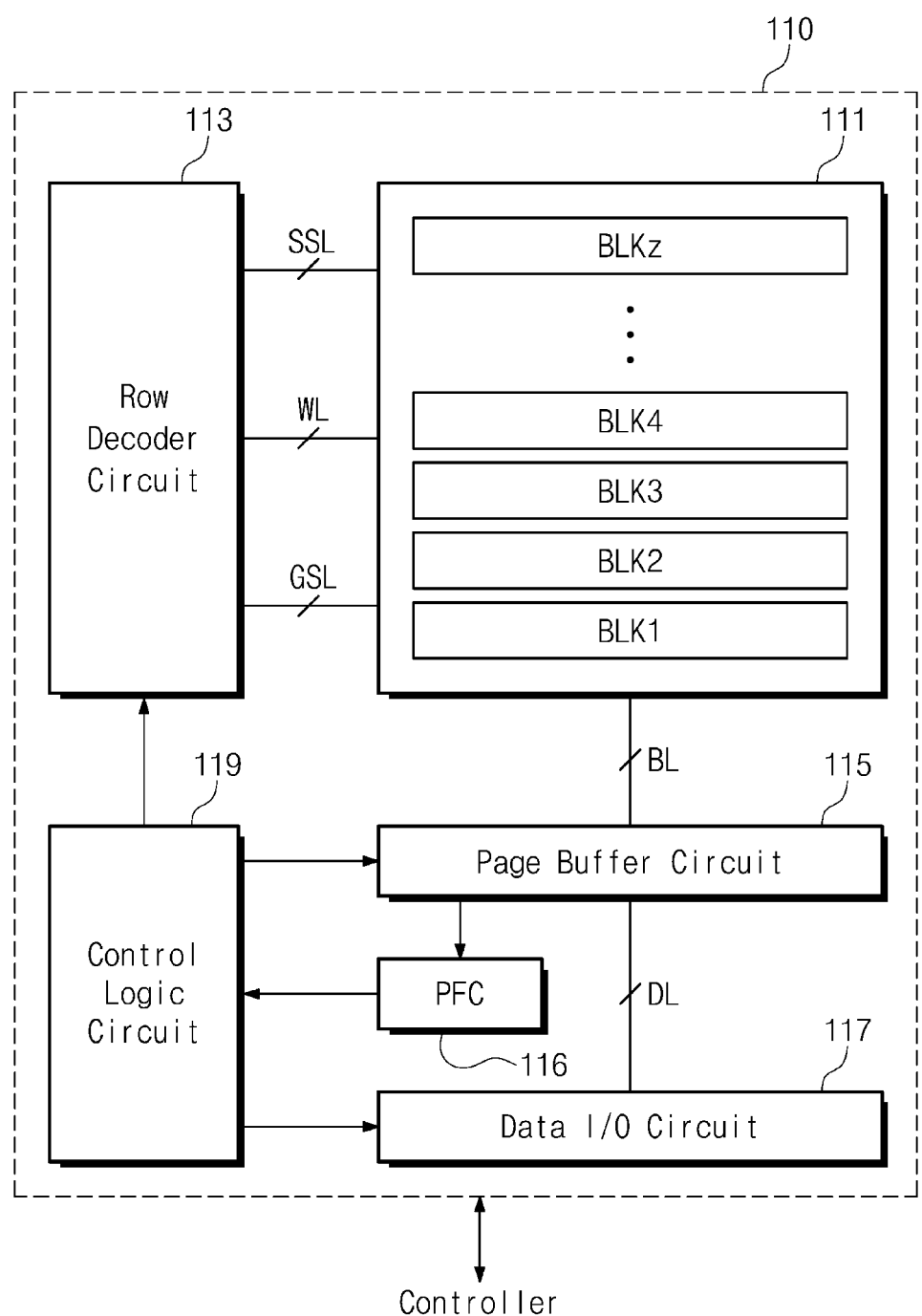
FIG. 8 illustrates a block diagram of a nonvolatile memory device in accordance with example embodiments of the inventive concept.

FIG. 8 illustrates a block diagram of a nonvolatile memory device 110 in accordance with example embodiments of the inventive concept. Referring to FIG. 8, the nonvolatile memory device 110 includes a memory cell array 111, a row decoder circuit 113, a page buffer circuit 115, a pass-fail check circuit (PFC) 116, a data input/output circuit 117, and a control logic circuit 119.

The memory cell array 111 includes a plurality of memory blocks BLK1~BLKz. Each memory block includes a plurality of memory cells. Each memory block may be connected to the row decoder circuit 113 through at least one ground select line GSL, a plurality of word lines WL, and at least one string select line SSL. Each memory block may be connected to the page buffer circuit 115 through a plurality of bit lines BL. The plurality of memory blocks BLK1~BLKz may be connected to the plurality of bit lines BL in common. Memory cells of the plurality of memory blocks BLK1~BLKz may have the same structure.

Each of the plurality of memory blocks BLK1~BLKz may be a unit of an erase operation. Memory cells of the memory cell array 111 may be erased by a unit of one memory block. Memory cells that belong to one memory block may be erased at the same time. Each memory block may be divided into a plurality of sub blocks. Each of the plurality of sub blocks may be a unit of an erase operation.

Each of the plurality of memory blocks BLK1~BLKz may include a physical storage space identified by a block address. Each of a plurality of word lines WL may correspond to a physical storage space identified by a row address. Each of a plurality of bit lines BL may correspond to a physical storage space identified by a column address.

Each memory block may include a plurality of physical pages and each physical page may include a plurality of memory cells. Each physical page may be a unit of a program operation. Memory cells of each physical page may be programmed at the same time. Each physical page may include a plurality of logical pages. Bits being programmed in each of memory cells of each physical page may form logical pages respectively. First bits being programmed in memory cells of each physical page may form a first logical page. Kth bits being programmed in memory cells of each physical page may form a Kth logical page.

The row decoder circuit 113 is connected to the memory cell array 111 through the plurality of ground select lines GSL, the plurality of word lines WL, and the plurality of string select lines SSL. The row decoder circuit 113 operates under the control of the control logic circuit 119. The row decoder circuit 113 decodes an address received from a controller 120 through an input/output channel and controls voltages applied to the string select lines SSL, the word lines WL, and the ground select lines SSL according to the decoded address.

For example, in a program operation, the row decoder circuit 113 can apply a program voltage to a selected word line of a memory block selected by an address and apply a pass voltage to unselected word lines of the selected memory block. In a read operation, the row decoder circuit 113 can apply a selection read voltage to a selected word line of a memory block selected by an address and apply an unselected read voltage to unselected word lines of the selected memory block. In an erase operation, the row decoder circuit 113 can apply erase voltages (e.g., a ground voltage or low voltages having levels similar to the ground voltage) to word lines of a memory block selected by an address.

The page buffer circuit 115 is connected to the memory cell array 111 through the plurality of bit lines BL. The page buffer circuit 115 is connected to the data input/output circuit 117 through a plurality of data lines DL. The page buffer circuit 115 operates under the control of the control logic circuit 119.

In a program operation, the page buffer circuit 115 can store data to be programmed in memory cells. The page buffer circuit 115 can apply voltages to the plurality of bit lines BL based on the stored data. For example, the page buffer circuit 115 may function as a write driver. In a read operation or a verification read operation, the page buffer circuit 115 can sense voltages of the bit lines BL and store a sensing result. For example, the page buffer circuit 115 may function as a sensing amplifier.

After the verification read operation, the pass-fail check circuit (PFC) 116 can receive the sensing result from the page buffer circuit 115. The pass-fail check circuit (PFC) 116 can determine a pass or a fail based on the received sensing result. For example, in a program verification read operation, the page buffer circuit 115 can count the number of on-cells being turned on. If the number of on-cells is greater than a threshold value, the pass-fail check circuit (PFC) 116 can determine a fail. If the number of on-cells is smaller than the threshold value, the pass-fail check circuit (PFC) 116 can determine a pass. For example, in an erase verification read operation, the page buffer circuit 115 can count the number of off-cells being turned off. If the number of off-cells is greater than a threshold value, the pass-fail check circuit (PFC) 116 can determine a fail. If the number of off-cells is smaller than the threshold value, the pass-fail check circuit (PFC) 116 can determine a pass. A determination result of a pass or a fail is transmitted to the control logic circuit 119.

The data input/output circuit 117 is connected to the page buffer circuit 115 through the plurality of data lines DL. The data input/output circuit 117 can output data read by the page buffer circuit 115 to the controller 120 through the input/output channel and transmit data received from the controller 120 through the input/output channel to the page buffer circuit 115.

The control logic circuit 119 can receive a command from the controller 120 through the input/output channel and receive a control signal through a control channel. In response to the control signal, the control logic circuit 119 can receive a command being received through input/output channel, route an address being received through input/output channel to the row decoder circuit 113, and route data being received through input/output channel to the data input/output circuit 117. The control logic circuit 119 can decode the received command and control the nonvolatile memory device 110 according to the decoded command.

In a read operation, the control logic circuit 119 can generate a data strobe signal (DQS) from a read enable signal (/RE) received from the controller 120 through the control channel. The generated data strobe signal (DQS) may be output to the controller 120 through the control channel. In a program operation, the control logic circuit 119 can receive the data strobe signal (DQS) from the controller 120 through the control channel.

Figure 9:
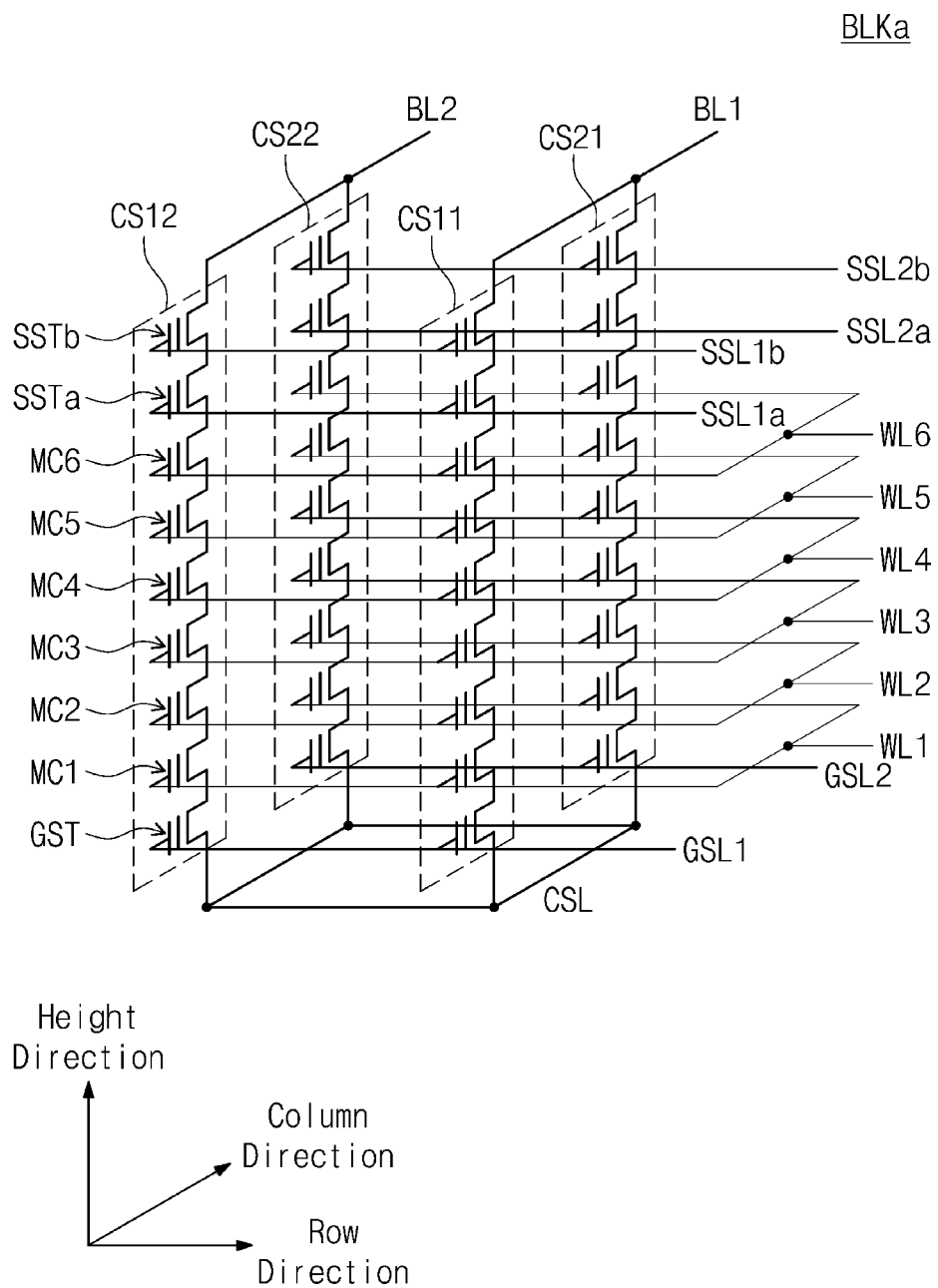
FIG. 9 illustrates a circuit diagram of a memory block in accordance with example embodiments of the inventive concept.

FIG. 9 illustrates a circuit diagram of a memory block BLKa in accordance with example embodiments of the inventive concept. Referring to FIG. 9, the memory block BLKa includes a plurality of cell strings CS11, CS21, CS12, and CS22. The cell strings CS11, CS21, CS12, and CS22 may be arranged along a row direction and a column direction to form rows and columns.

For example, the cell strings CS11 and CS12 arranged along the row direction may form a first row and the cell strings CS21 and CS22 arranged along the row direction may form a second row. The cell strings CS11 and CS21 arranged along the column direction may form a first column and the cell strings CS12 and CS22 arranged along the column direction may form a second column.

Each cell string may include a plurality of transistors. The cell transistors include ground select transistors GST, memory cells MC1~MC6, and string select transistors SSTa and SSTb. The ground select transistor GST, the memory cells MC1~MC6 and string select transistors SSTa and SSTb of each cell string may be laminated in a height direction perpendicular to a plane (e.g., a plane on a substrate of the memory block BLKa) on which the cell strings (CS11, CS21, CS12, CS22) are arranged along rows and columns.

The cell transistors may be charge trap type transistors having threshold voltages that vary depending on the amounts of charges trapped in an insulating layer.

Sources of the lowermost ground select transistors GST may be connected to a common source line CSL in common.

Control gates of the ground select transistors GST of the cell strings CS11 and CS12 of the first row are connected to a ground select line GSL1 in common and control gates of the ground select transistors GST of the cell strings CS21 and CS22 of the second row are connected to a ground select line GSL2 in common. That is, cell strings of different rows are connected to different ground select lines.

The memory block BLKa may be changed so that each cell string has more than one ground select transistor GST.

The ground select transistors of different heights of the same row may be connected to different ground select lines. As an illustration, the memory block BLKa may be changed so that ground select transistors connected to ground select transistors of the same height of different rows are connected to one another to be controlled in common. The memory block BLKa may be changed so that ground select lines connected to ground select transistors are connected to one another to be controlled in common.

Control gates of memory cells located at the same height (or order) from the substrate (or ground select transistors GST) may be connected to one word line in common, and control gates of memory cells located at different heights (or orders) from the substrate (or ground select transistors GST) may be connected to different word lines WL1~WL6 respectively. For example, the memory cells MC1 are connected to the word line WL1 in common. The memory cells MC2 are connected to the word line WL2 in common. The memory cells MC3 are connected to the word line WL3 in common. The memory cells MC4 are connected to the word line WL4 in common. The memory cells MC5 are connected to the word line WL5 in common. The memory cells MC6 are connected to the word line WL6 in common.

At first string select transistors SSTa of the same height (or order) of the cell strings CS11, CS21, CS12, and CS22, control gates of the first string select transistors SSTa of different rows are connected to different string select lines SSL1a and SSL2a respectively. For example, the first string select transistors SSTa of the cell strings CS11 and CS12 are connected to the string select line SSL1a in common. The first string select transistors SSTa of the cell strings CS21 and CS22 are connected to the string select line SSL2a in common.

At second string select transistors SSTb of the same height (or order) of the cell strings CS11, CS21, CS12, and CS22, control gates of the second string select transistors SSTb of different rows are connected to different string select lines SSL1b and SSL2b respectively. For example, the second string select transistors SSTb of the cell strings CS11 and CS12 are connected to the string select line SSL1b in common. The second string select transistors SSTb of the cell strings CS21 and CS22 are connected to the string select line SSL2b in common.

That is, cell strings of different rows are connected to different string select lines. String select transistors of the same height (or order) of cell strings of the same row are connected to the same string select line. String select transistors of different heights (or orders) of cell strings of the same row are connected to different string select lines.

String select transistors of cell strings of the same row may be connected to one string select line in common. For example, the string select transistors SSTa and SSTb of the cell strings CS11 and CS12 of the first row may be connected to one string select line in common. The string select transistors SSTa and SSTb of the cell strings CS21 and CS22 of the second row may be connected to one string select line in common.

Columns of the cell strings CS11, CS21, CS12, and CS22 are connected to different bit lines BL1 and BL2 respectively. For example, the string select transistors SSTb of the cell strings CS11 and CS21 of the first column are connected to the bit line BL1 in common. The string select transistors SSTb of the cell strings CS12 and CS22 of the second column are connected to the bit line BL2 in common.

In the memory block BLKa, memory cells located at the same height from the substrate may be characterized by sharing a word line. In other memory blocks, word lines may be characterized by not being shared. For example, a memory cell of a first height of a first memory block can share a word line with other memory cells of the first height of the first memory block. The memory cell of the first height of the first memory block may not share a word line with a memory cell of the first height of a second memory block. A sub block may be characterized by a part of the memory block BLKa.

The cell strings CS11 and CS12 may form a first plane. The cell strings CS21 and CS22 may form a second plane.

In a memory block BLKa, memory cells of each height of each plane may form a physical page. The physical page may be a write unit and a read unit of the memory cells MC1~MC6. For example, one plane of the memory block BLKa may be selected by the string select lines SSL1a, SSL1b, SSL2a, and SSL2b. When a turn-on voltage is supplied to the string select lines SSL1a and SSL1b and a turn-off voltage is supplied to the string select lines SSL2a and SSL2b, the cell strings CS11 and CS12 of the first plane are connected to the bit lines BL1 and BL2. That is, the first plane is selected. When a turn-on voltage is supplied to the string select lines SSL2a and SSL2b and a turn-off voltage is supplied to the string select lines SSL1a and SSL1b, the cell strings CS21 and CS22 of the second plane are connected to the bit lines BL1 and BL2. That is, the second plane is selected. In the selected plane, one row of the memory cells MC1~MC6 may be selected by the word lines WL1~WL6. In the selected row, a select voltage may be applied to the second word line WL2 for example and an unselect voltage may be applied to the remaining word lines WL1 and WL3~WL6. That is, a physical page corresponding to the second word line WL2 of the second plane may be selected by adjusting voltages of the string select lines SSL1a, SSL1b, SSL2a, and SSL2b and the word lines WL1~WL6. In the memory cells MC2 of the selected physical page, a write or read operation may be performed.

Two or more bits may be written in each of the memory cells MC1~MC6. Bits being written in each of the memory cells MC1~MC6 that belong to one physical page form logical pages. A first bit being written in each of the memory cells MC1~MC6 that belong to one physical page forms a first logical page. An Nth bit being written in each of the memory cells MC1~MC6 that belong to one physical page forms an Nth logical page. The logical page may be a unit of data access. When a read operation is performed in one physical page, data may be accessed by a unit of a logical page.

In the memory block BLKa, an erase of the memory cells MC1~MC6 may be performed by a memory block unit or a sub block unit. When an erase operation is performed by a memory block unit, all the memory cells MC1~MC6 of the memory block BLKa may be erased at the same time according to an erase request (e.g., an erase request from an external memory controller). When an erase operation is performed by a sub block unit, a part of the memory cells MC1~MC6 of the memory block BLKa may be erased at the same time according to an erase request and the remaining memory cells may be erase-prohibited. A low voltage (for example, a ground voltage or a voltage having a level similar to the ground voltage) may be supplied to a word line connected to memory cells MC1~MC6 being erased and a word line connected to the erase-prohibited memory cells may be floated.

The memory block BLKa illustrated in FIG. 9 is illustrative. In other embodiments of the inventive concept, the number of rows of cell strings may for example increase or decrease. As the number of rows of cell strings changes, the number of string select lines or ground select lines connected to rows of the cell strings, and the number of cell strings connected to one bit line may also be changed.

The number of columns of cell strings may increase or decrease. As the number of columns of cell strings changes, the number of bit lines connected to columns of the cell strings, and the number of cell strings connected to one string select line may also be changed.

A height of the cell strings may increase or decrease. For example, the number of ground select transistors, memory cells or string select transistors that are laminated to each cell string may increase or decrease.

Memory cells that belong to one physical page may correspond to at least three logical pages. For example, k (k is a positive integer greater than 2) number of bits may be programmed in one memory cell. In the memory cells MC that belong to one physical page, k number of bits being programmed in each memory cell may form k number of logical pages respectively.

As described above, the memory block BLKa is provided as a three dimensional (3D) memory array. The 3D memory array is monolithically formed in one or more physical levels of arrays of memory cells MC1~MC6 having an active area disposed above a silicon substrate and circuitry associated with the operation of those memory cells MC1~MC6, whether such associated circuitry is above or within such substrate. The term "monolithic" means that layers of each level of the array are directly deposited on the layers of each underlying level of the array.

In an embodiment of the present inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells MC1~MC6, the at least one select transistor having the same structure with the memory cells MC1~MC6 and being formed monolithically together with the memory cells MC1~MC6.

The following patent documents, which are hereby incorporated by reference, describe suitable configurations for three-dimensional memory arrays, in which the three-dimensional memory array is configured as a plurality of levels, which word lines and/or bit lines shared between levels: U.S. Pat. Nos. 7,679,133; 8,553,466; 8,654,587; 8,559,235; and US Pat. Pub. No. 2011/0233648.

Figure 10:
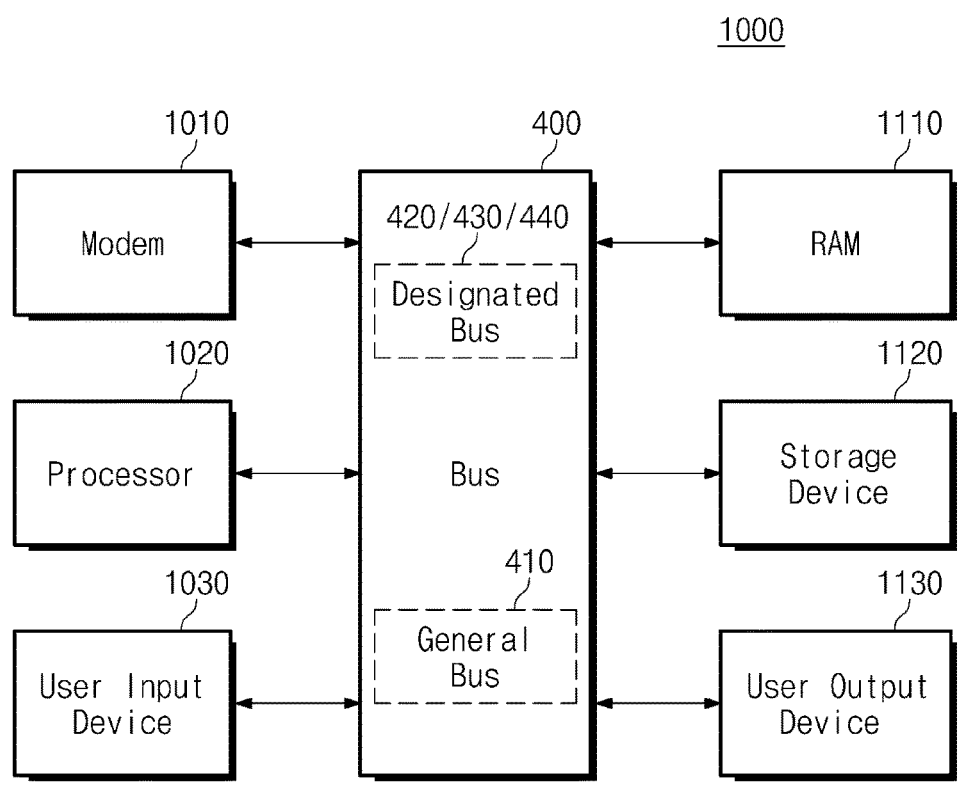
FIG. 10 illustrates a block diagram of a computing device in accordance with example embodiments of the inventive concept.

FIG. 10 illustrates a block diagram of a computing device 1000 in accordance with example embodiments of the inventive concept. Referring to FIG. 10, the computing device 1000 includes a modem 1010, a processor 1020, a user input device 1030, a random access memory (RAM) 1110, a storage device 1120, and a user output device 1130. The computing device 1000 may correspond to any one of the semiconductor devices 10, 20 or 30 described with reference to FIG. 1, 3 or 4.

A bus 400 is configured to provide a channel between constituent elements of the computing device 1000. For example, the bus 400, as described with reference to FIG. 1, 3 or 4, may include a general bus 410 and a designated bus 420, 430 or 440.

The modem 1010, the processor 1020 and the user input device 1030 may respectively correspond to and serve as the master circuits 210, 220 and 230 described with reference to FIG. 1, 3 or 4. The RAM 1110, the storage device 1120 and the user output device 1130 may correspond respectively to and serve as the slave circuits 310, 320 and 330 described with reference to FIG. 1, 3 or 4.

At least one of the modem 1010, the processor 1020 and the user input device 1030 is connected to the designated bus 420, 430 or 440 and may include a determining circuit (DC) such as described with reference to FIG. 1, 3 or 4. The determining circuit (DC) can determine whether to activate the general bus 410 or the designated bus 420, 430 or 440. A circuit including the determining circuit (DC) and a circuit connected to the designated bus 420, 430 or 440 are not limited.

At least one of the RAM 1110, the storage device 1120 and the user output device 1130 may be connected to the designated bus 420, 430 or 440. A circuit connected to the designated bus 420, 430 or 440 is not limited.

The modem 1010 may perform a communication with an external device under the control of the processor 1020. For example, the modem 1010 may perform a wired or wireless communication with an external device. The modem 1010 may perform a communication based on at least one of various wireless communication methods such as for example long term evolution (LTE), WiMax, global system for mobile communication (GSM), code division multiple access (CDMA), Bluetooth, near field communication (NFC), WiFi, radio frequency Identification (RFID), or the like, or at least one of various wired communication methods such as for example universal serial bus (USB), serial AT attachment (SATA), a high speed interchip (HSIC), small computer system interface (SCSI), Firewire, peripheral component interconnection (PCI), PCI express (PCIe), non-volatile memory express (NVMe), universal flash storage (UFS), secure digital (SD), SDIO, universal asynchronous receiver transmitter (UART), serial peripheral interface (SPI), high speed SPI (HS-SPI), RS232, inter-intergrated circuit (I2C), HS-I2C, integrated-interchip sound (I2S), Sony/Philips digital interface (S/PDIF), multimedia card (MMC), embedded MMC (eMMC), or the like.

The processor 1020 can control an overall operation of the computing device 1000 and perform a logical operation. The processor 1020 may be a hard-based data processing device including a circuit physically configured to execute operations expressed by a code or a command included in a program. For example, the processor 1020 may be constituted by a system on chip (SoC). The processor 1020 may be a general purpose processor, a special purpose processor or an application processor.

The user input device 1030 can receive a signal from a user under the control of the processor 1020. For example, the user input device 1030 may include for example a keyboard, a keypad, a button, a touch panel, a touch screen, a touch pad, a touch ball, a camera, a microphone, a gyroscope sensor, a vibration sensor, or the like.

The RAM 1110 can communicate with the processor 1020. The RAM 1110 may be a main memory of the processor 1020 or the computing device 1000. The processor 1020 can temporarily store a code or data in the RAM 1110. The processor 1020 can execute a code and process data using the RAM 1110. The processor 1020 can execute various types of software such as an OS (operating system), an application, or the like using the RAM 1110. The processor 1020 can control an overall operation of the computing device 1000 using the RAM 1110. The RAM 1110 may include volatile memory such as for example SRAM, DRAM, SDRAM, or the like, or nonvolatile memory such as for example PRAM, MRAM, RRAM, PRAM, or the like.

The storage device 1120 can communicate with the processor 1020. The storage device 1120 can store data that needs to be preserved in the long term. That is, the processor 1020 can store data that needs to be preserved in the long term in the storage device 1120. The storage device 1120 can store source codes of various types of software such as an operating system (OS), an application, or the like. The storage device 1120 can store data processed by various types of software such as an OS, an application, or the like.

The processor 1020 can drive various types of software such as an OS, an application, or the like by loading source codes stored in the storage device 1120 into the RAM 1110 and executing the codes loaded into the RAM 1110. The processor 1020 can load data stored in the storage device 1120 into the RAM 1110 and process the data loaded into the RAM 1110. The processor 1020 can store data that needs to be preserved in the long term among data stored in the RAM 1110 in the storage device 1120.

The storage device 1120 may include a nonvolatile memory device such as for example a flash memory, a PRAM, a MRAM, a RRAM, a FRAM, or the like.

The storage device 1120 may include the storage device 100 described with reference to FIGS. 5 through 7. That is, the storage device 1120 may include the nonvolatile memory device 110, the controller 120, and the buffer memory 130 shown in FIG. 5. The controller 120 may include the general bus 410 and the designated buses 420, 430 or 440.

The user output device 1130 can output a signal to a user under the control of the processor 1020. The user output device 1130 may include for example a liquid crystal display (LCD), an organic light emitting diode (OLED) display device, an active matrix OLED (AMOLED) display device, a speaker, a motor, or the like.

As described above, the semiconductor device in accordance with example embodiments of the inventive concept may be hierarchically implemented. For example, the storage device 1120 may include the controller 120, and the controller 120 may be configured to operate using the general bus 410 and the designated buses 420, 430 and 440. The storage device 1120 as part of the computing device 1000 may be configured to communicate with the general bus 410 and the designated buses 420, 430 or 440. If the bus 400 according to the example embodiments of the inventive concept including the general bus 410 and the designated buses 420, 430 or 440 is hierarchically implemented, an operation speed and service quality of the computing device 1000 may be further improved.

According to the example embodiments of the inventive concept, work having higher priority is executed through a designated bus. Thus, a schedule in which work having higher priority is executed before work having lower priority is possible, and latency of the work having higher priority is reduced. Thus, a semiconductor device having an improved operation speed and improved service quality and an operation method thereof are provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. Therefore, the above-disclosed subject matter is to be considered illustrative, and not restrictive.

What is claimed is:

1. A semiconductor device comprising:
a plurality of circuits;
a general bus that is directly connected to each of the plurality of circuits and provides a general channel among the plurality of circuits; and
a designated bus that is directly connected to a subgroup of circuits among the plurality of circuits and provides a designated channel among the subgroup of circuits, wherein
the subgroup of circuits contains fewer than all of the plurality of circuits,
the subgroup of circuits is prohibited from performing a communication through the general bus while the subgroup of circuits performs a communication through the designated bus, and
a communication conveyed through the general bus is not conveyed through the designated bus.

2. The semiconductor device of claim 1, wherein the subgroup of circuits is prohibited from performing a communication through the designated bus while the subgroup of circuits performs a communication through the general bus.

3. The semiconductor device of claim 1, wherein the subgroup of circuits handles general work having lower priority through the general bus and handles work having higher priority through the designated bus.

4. The semiconductor device of claim 1, wherein:
at least one circuit of the subgroup of circuits receives a request from an external device, and
the subgroup of circuits exclusively selects: (a) the general bus to perform a communication depending on a first characteristic of the request and (b) the designated bus to perform the communication depending on a second characteristic of the request.

5. The semiconductor device of claim 1, wherein:
at least one circuit of the subgroup of circuits receives a request from an external device, and
the subgroup of circuits selects one of the general bus and the designated bus to perform a communication depending on a depth of a queue allocated to process the request.

6. The semiconductor device of claim 1, wherein the plurality of circuits comprises:
a host interface that communicates with an external host device;
a manager circuit that communicates with a nonvolatile memory device;
a buffer control circuit that communicates with a random access memory; and
a processor that controls the host interface, the manager circuit, and the buffer control circuit.

7. The semiconductor device of claim 6, wherein the subgroup of circuits comprises the host interface and the manager circuit.

8. The semiconductor device of claim 7, wherein the host interface controls connections to the general bus and the designated bus such that a connection to the designated bus is activated when: (a) a priority of a request received from the external host device is high, (b) a depth of a queue allocated by the external host device is smaller than a reference value, or (c) a retransmission request due to a time-out is received from the external host device.

9. The semiconductor device of claim 6, wherein the host interface, the manager circuit, the buffer control circuit, the processor, the nonvolatile memory device, the random access memory, the designated bus, and the general bus form a solid state drive (SSD).

10. The semiconductor device of claim 1, wherein:
the designated bus directly connects a first circuit and a second circuit from among the subgroup of circuits, and a communication conveyed through the general bus is not conveyed through the designated bus.

11. The semiconductor device of claim 10, wherein:
the designated bus directly connects a third circuit and a fourth circuit from among the subgroup of circuits, and
a communication conveyed through the general bus is not conveyed through the designated bus.

12. The semiconductor device of claim 1, wherein:
the designated bus connects first through third circuits from among the subgroup of circuits to one another, and
a communication conveyed through the general bus is not conveyed through the designated bus.

13. The semiconductor device of claim 1, wherein the plurality of circuits comprises:
a modem that communicates with an external device;
a user input device that receives a signal from a user;
a user output device that outputs a signal to the user;
a random access memory that temporarily stores data;
a storage device that stores data long term; and
a processor that controls the modem, the user input device, the user output device, the random access memory, and the storage device.

14. A semiconductor device comprising:
a plurality of circuits;
a general bus connected to each of the plurality of circuits; and
a designated bus connected to a first circuit and a second circuit from among the plurality of circuits, wherein
the first circuit determines a priority of a request with respect to the second circuit, accesses the second circuit through the designated bus upon a determination that the priority of the request is high, and accesses the second circuit through the general bus upon a determination that the priority of the request is low.

15. The semiconductor device of claim 14, wherein:
the designated bus is further connected to a third circuit among the plurality of circuits, and
the third circuit determines a priority of another request with respect to the second circuit, accesses the second circuit through the designated bus upon a determination that the priority of the other request is high, and accesses the second circuit through the general bus upon a determination that the other request is low.

16. The semiconductor device of claim 14, further comprising:
a second designated bus connected to a third circuit and a fourth circuit among the plurality of circuits, wherein
the third circuit determines a priority of another request with respect to the fourth circuit, accesses the fourth circuit through the designated bus upon a determination that the priority of the other request is high, and accesses the fourth circuit through the general bus upon a determination that the other request is low.

17. A storage device comprising:
a nonvolatile memory device; and
a memory controller that controls operations in the nonvolatile memory device responsive to an external request, wherein:
the memory controller comprises a plurality of circuits, a general bus that is connected to each of the plurality of circuits, and a designated bus that is connected to a first circuit and a second circuit from among the plurality of circuits,
the first circuit accesses the second circuit selectively through the designated bus and the general bus according to a priority of the external request, and
the second circuit provides communication between the first circuit and the nonvolatile memory device.

18. The storage device of claim 17, wherein the first circuit accesses the second circuit through the designated bus upon a determination that the priority is high and accesses the second circuit through the general bus upon a determination that the priority is low.

19. The storage device of claim 17, wherein:
the memory controller further comprises a second designated bus connected to a third circuit and a fourth circuit from among the plurality of circuits, and
the third circuit accesses the fourth circuit selectively through the second designated bus and the general bus according to a priority of another external request.

* * * * *